W. S. HADAWAY, Jr.
ELECTRIC HEATING APPARATUS.
APPLICATION FILED MAY 1, 1909.
1,046,777.
Patented Dec. 10, 1912.
3 SHEETS—SHEET 1.
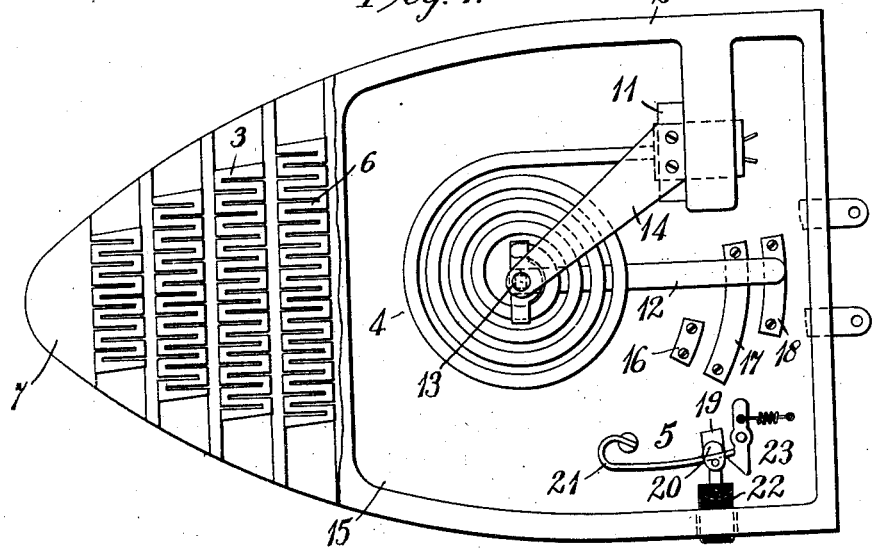
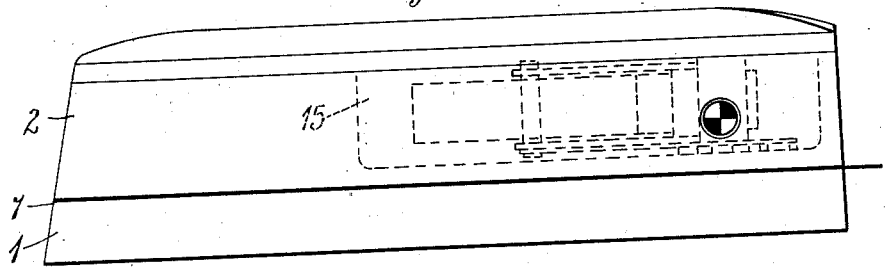
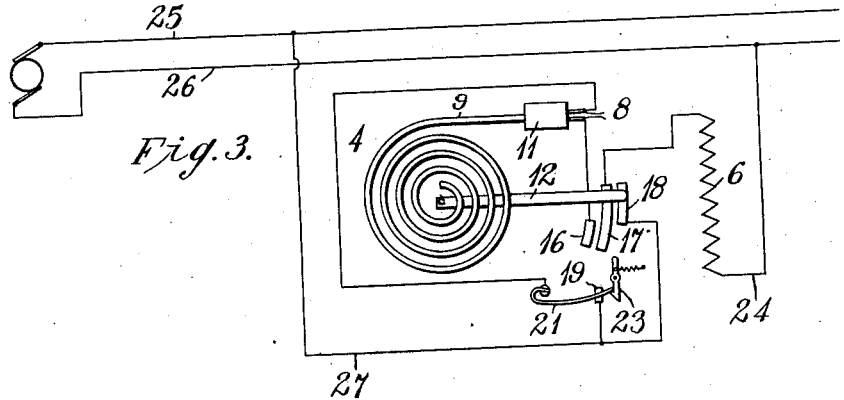
WITNESSES:
INVENTOR
William S. Hadaway Jr.
BY
Wesley G. Carr
ATTORNEY W. S. HADAWAY, Jr.
ELECTRIC HEATING APPARATUS.
APPLICATION FILED MAY 1, 1909.
1,046,777.
Patented Dec. 10, 1912.
3 SHEETS—SHEET 2.
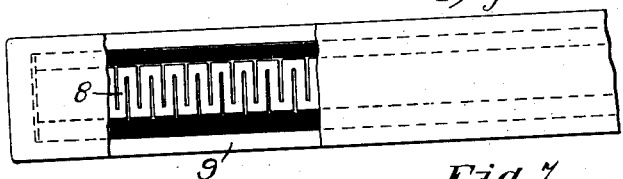
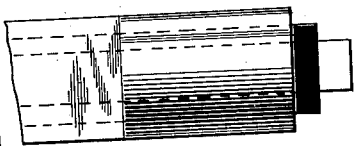
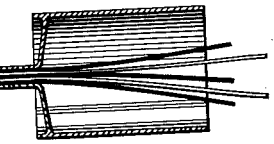
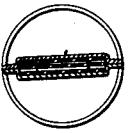
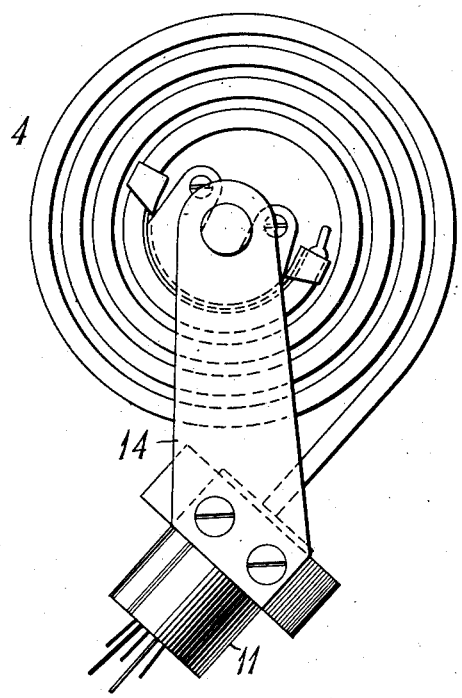
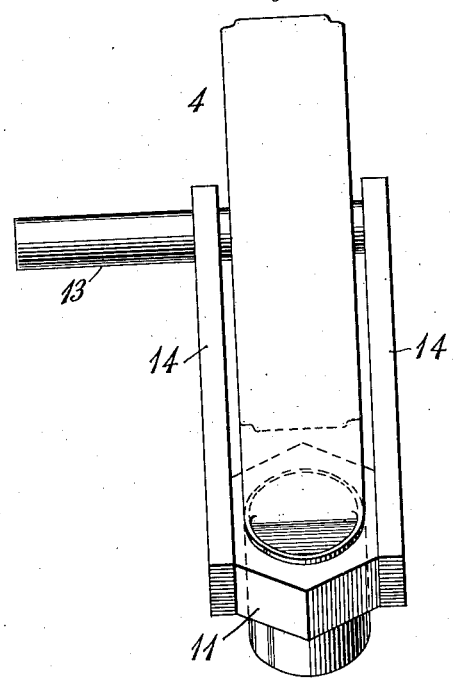
WITNESSES:
INVENTOR
William S. Hadaway Jr.
BY
ATTORNEY W. S. HADAWAY, Jr.
ELECTRIC HEATING APPARATUS.
APPLICATION FILED MAY 1, 1909.
1,046,777.
Patented Dec. 10, 1912.
3 SHEETS—SHEET 3.
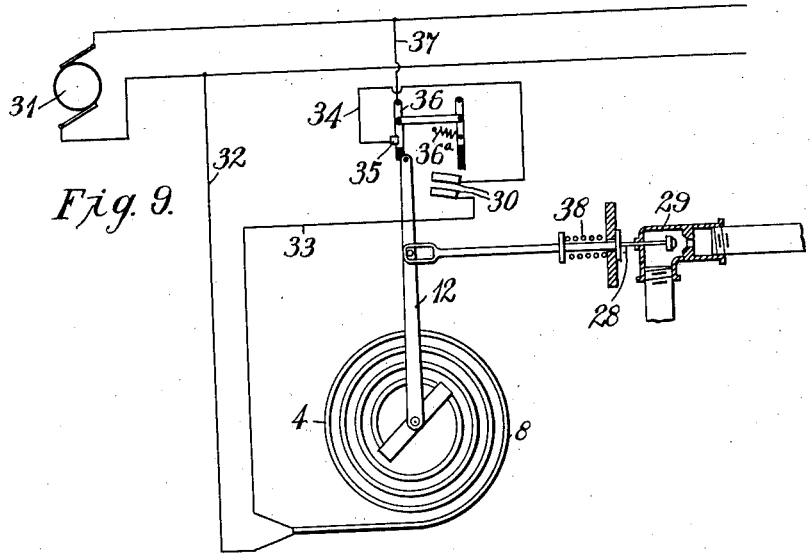
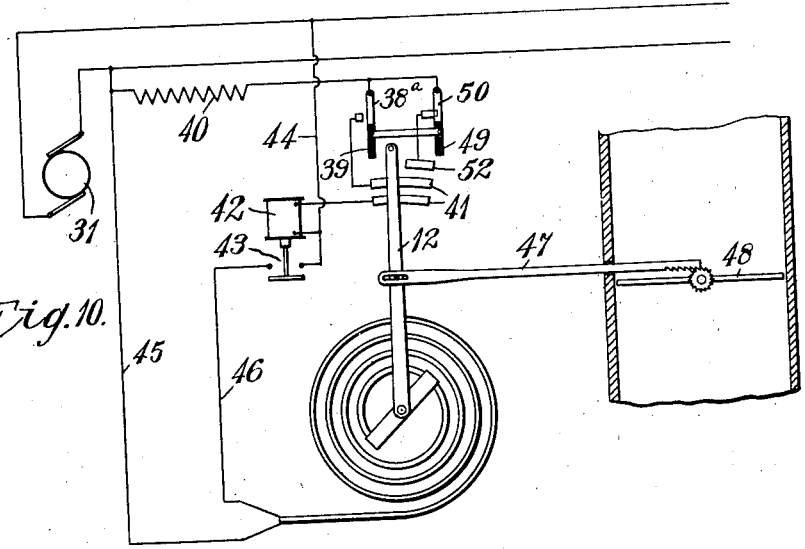
WITNESSES:
Fred H Miller
INVENTOR
William S. Hadaway Jr.
BY
Wesley G. Carr
ATTORNEY

UNITED STATES PATENT OFFICE.

WILLIAM S. HADAWAY, JR., OF EAST ORANGE, NEW JERSEY, ASSIGNOR TO WESTINGHOUSE ELECTRIC AND MANUFACTURING COMPANY, A CORPORATION OF PENNSYLVANIA.

ELECTRIC HEATING APPARATUS.

1,046,777.

Specification of Letters Patent. Patented Dec. 10, 1912.

Application filed May 1, 1909. Serial No. 493,409.

*To all whom it may concern:*

Be it known that I, WILLIAM S. HADAWAY, Jr., a citizen of the United States, and a resident of East Orange, in the county of Essex and State of New Jersey, have invented a new and useful Improvement in Electric Heating Apparatus, of which the following is a specification.

My invention relates to electric heating apparatus and particularly to electrically heated sad irons and other devices of general utility.

One object of my invention is to provide a means which shall be dependent upon a predetermined temperature for automatically producing a positive dynamic action and a second object is to apply the means just referred to to an electrically heated sad iron or similar device for interrupting the circuit of the heating element when a predetermined temperature is exceeded in the device.

In my copending application, Serial No. 493,404, filed of even date herewith, I have illustrated and described a combined thermostat and electric heater comprising a heating element suitably inclosed in and insulated from a sheath composed of unlike metals welded or otherwise secured together at their edges. The structure of this thermostat is such that a movement of an arm or indicator may be effected by variations of temperature in the surrounding medium when the heating element is electrically disconnected.

According to my present invention, I have utilized this relatively slight movement for establishing an electric circuit through the heating element, of which the thermostat is composed, thereby effecting a positive dynamic action of the arm, which is operatively connected to the thermostat. The mechanical movement produced by this means may be utilized for various purposes, as hereinafter more fully pointed out.

Figure 1 of the accompanying drawings is a plan view, with certain of the parts broken away, of an electrically heated sad iron embodying my invention. Fig. 2 is a side elevation of the structure shown in Fig. 1, and Fig. 3 is a diagrammatic view showing the circuit connections for the heating element and the thermostat which are embodied in the structure of the sad iron. Figs. 4 and 5 are views at right angles to each other, and Figs 6, 7 and 8 are detail views, on a larger scale, of the combined electric heater and thermostat shown in the other figures. Figs. 9 and 10 are diagrammatic views which are illustrative of other applications of my invention.

Referring to Figs. 1 to 8, inclusive, the electrically heated sad iron here shown comprises a base plate 1, a body member 2, a resistance or heating element 3 interposed between the two, a combined electric heater and thermostat 4 and a circuit interrupter 5. The resistance or heating element 3 may be of any suitable form, being preferably constructed in accordance with my copending application, Serial No. 445,199, comprising a slotted resistance ribbon 6 assembled between insulating plates or sheets 7 which are adapted to be fused together upon the application of heat in such a way that the ribbon is practically embedded in homogeneous insulation.

The combined electric heater and thermostat, hereinafter referred to as the thermostat 4, comprises a resistance element 8 which is inclosed by and insulated from a metal sheath 9 composed of strips 10 of unlike metals welded together at their edges. The rod or bar thus formed is bent into the form of a spiral (see Figs. 1 and 4 of the drawings) and is rigidly supported at its outer end by means of a relatively stationary bracket 11. A contact arm 12 is secured to a shaft 13 which is rotatably supported by projections 14 on the bracket 11, with its axis substantially coincident with that of the spiral. The arm 12 is so connected to the inner end of the spiral that the movement of the thermostat, caused by variations in temperature, effects a rotative movement of the said arm in the one direction or the other. The thermostat 4 is mounted within a chamber or recess 15 in the body member 2 of the sad iron, and the outer end of the arm 12 is adapted to engage a plurality of stationary contact ring segments 16, 17 and 18, as hereinafter described.

The switch 5 comprises a stationary contact member 19, a movable contact member 20 secured to the outer end of a resilient arm or spring 21, which coöperates therewith, a push button 22 for closing the switch and a latch 23 for holding the switch closed, in opposition to the action of the spring 21.

The operation of the device will be readily understood from the diagram of Fig. 3, to which reference may now be had. The heating element 6 of the device is interposed in circuit between one terminal 24, which may be connected to one side of any suitable supply circuit 25—26, and the contact ring segment 17. The contact ring segment 18 and the contact member 19 are both connected to the opposite terminal 27 of the device. The resistance element 8 of the thermostat is interposed in circuit between the ring segment 16 and the contact member 21. The arrangement of parts is such that, under normal conditions, the contact arm 12 engages the contact ring segments 17 and 18, so that a circuit is established from the line conductor 26 through the terminal 24, resistance 6, contact segments 17 and 18, and the terminal 27 to the opposite line conductor 25.

If the supply circuit of the electric sad iron is not interrupted, when the device is not in use, the heat to which the thermostat is subjected will, of course, gradually increase and a relatively wide movement of the contact arm 12 will result. This movement serves to bring the contact arm 12 into engagement with the segment 16, thereby completing a branch circuit from the segment 17 through contact member 16, resistance element 8 of the thermostat, switch 5 and terminal 27 to the line conductor 25. Electric energy is thus supplied to the resistance element of the thermostat and, consequently, a positive movement of the arm 12 results. This movement is relied upon to release the latch 23, the end of the arm 12 coming into engagement with one end of the latch, and to open the circuits established through the resistance element 6 of the heater and the resistance element 8 of the thermostat. In order to close this circuit, it is necessary to press the push button 22 to permit the latch 23 to again catch the extremity of the spring contact member 21.

If the thermostat is adapted to be automatically connected in series relation to the resistance element of the heater, instead of being connected directly across the circuit, when the heat in the device exceeds a predetermined amount, the action of the thermostat in cutting out the device will be somewhat delayed because of the resulting reduction in the current traversing both the resistance elements. Under these conditions, the thermostat constitutes a storage reservoir and serves to supply heat to the working surface of the iron, if it is brought into service before the heat has risen sufficiently, during a temporary period of idleness, to open the switch 5. In this way, the heat of the thermostat is added to that of the heater during short inactive periods.

Reference may now be had to Figs. 9 and 10 of the drawings, in which like parts are designated by the same reference characters. In Fig. 9, the arm 12 of the thermostat is connected by a lost-motion connection to the stem 28 of a valve 29.

The operation of the system is as follows: If it is assumed that the thermostat is located in a room to be heated by means of steam or hot water, which is admitted to suitable radiators through the valve 29, and the parts are in the positions indicated in the drawing; as soon as the temperature of the room rises above a predetermined degree, the arm 12 will gradually take up the lost motion in its connection to the valve stem and will move into engagement with stationary contact members 30. When the members 30 are bridged, an electric circuit is established from any suitable source, such as generator 31, through conductor 32, the resistance element of coil 8, conductor 33, contact members 30, arm 12, conductor 34, contact member 35, a switch blade 36 and conductor 37 to the opposite terminal of the generator 31.

The current which flows through the resistance element of the coil 8 will raise the temperature of such element sufficiently to move the arm 12 such further distance as to close the valve 29 and separate the switch blade 36 from the contact terminal 35 and thus interrupt the flow of current through the thermostat. As soon as the circuit is interrupted, the thermostat will gradually return to the position which it normally occupies, by reason of the temperature of the room, and the valve will be gradually opened by a spring 38. The switch blade 36 will be returned to the position shown in the diagram, by a spring 36ª, as soon as the position of the arm 12 will permit. The valve will not be closed again until the process is repeated by the outer end of the contact arm 12 coming into engagement with the contact members 30.

In the arrangement shown in Fig. 10, the thermostat is adapted to close a switch 38ª when the temperature falls below a predetermined amount, by the engagement of the outer end of the arm 12 with a projection 39 with which the switch blade is provided. When the switch 38ª is closed, a circuit is established from the generator 31 through a resistance 40, switch 38ᵃ, contact members 41 (which are bridged by a contact arm 12), the magnet winding 42 of a relay switch 43 and a conductor 44 to the opposite terminal of the generator. The relay switch 43 is closed, when its magnet is energized, and a circuit is completed from the generator through conductor 45, the resistance element of the thermostat, conductor 46, switch 43, and conductor 44 to the opposite terminal of the generator. The heat generated in the thermostat causes the arm 12 to rotate in a clockwise direction and to open a damper 48 by causing a positive movement of an actuating rod 47 to which the arm 12 is operatively connected by a lost-motion connection. The arrangement of parts is such that the movement of the arm 12 produces a 90° rotative movement of the damper 48 so that it comes to rest in its open position. Assuming that the damper 48 is located in a hot air furnace pipe, it will be understood that the temperature of the room will be raised when the damper is open. When the positive rotative movement of the arm 12 occurs, its free end engages a projection 49 with which a switch blade 50 is provided and moves the said blade and the blade 38ᵃ, to which it is connected, to break the circuit which was previously completed through the relay winding 42 and thus interrupt the supply of energy to the resistance element of the thermostat. As the thermostat is cooled to the temperature of the room, the arm 12 will gradually return to its mid-position, and, since more heat is continually being supplied to the room through the furnace pipe, the temperature will ultimately be sufficiently increased to cause the thermostat arm 12 to engage a contact member 52. A circuit will then be completed through the switch 50 and the winding 42 of the relay switch 43, and energy will be supplied to the thermostat as indicated above, and another 90° rotative movement of the damper to its closed position will be effected. As the room is successively heated above and cooled below predetermined limits, which may be relatively close together, the damper will be successively opened and closed. In very cold weather, the damper would obviously be open the greater part of the time, and, in warm weather, the damper would be closed most of the time.

My invention may be utilized in many relations which I have not specifically set forth, and, in the case of melting pots for linotype machines and the like, in which it is desirable to maintain an approximately constant temperature, a primary heater element may be continually maintained in service and my invention may be applied to a small auxiliary heater, substantially as hereinbefore set forth.

It is evident that my invention is applicable to various heating devices for the purpose of securing automatic regulation, and I desire that only such limitations in its scope shall be imposed as are indicated in the appended claims.

I claim as my invention:

1. The combination with a thermostat having a resistance heating element embodied therein, of means dependent upon a predetermined movement of the thermostat for automatically supplying electric energy to said element.

2. The combination with a thermostatic member having a normally inactive heat-generating element embodied therein, of means for rendering said heat-generating element active to produce a positive dynamic action by said member when a predetermined and relatively slight movement thereof is effected by externally applied heat.

3. The combination with a thermostat having a resistance heating element embodied therein, of means dependent upon a relatively slight movement of the thermostat for automatically supplying electric energy to said heating element.

4. The combination with a thermostatic member having a limited degree of movement under the action of external heat, of means controlled by said member for producing a further movement thereof.

5. In an electric heating device, the combination with a main heating element, of a thermostat having a heating element embodied therein and actuated by a predetermined temperature to interrupt the circuit of the main heating element and close the circuit of its internal heating element.

6. In an electrically heated device, the combination with a resistance element, of a thermostat having a heater element embodied therein, a switch in the circuit of the resistance element, and means dependent upon a predetermined temperature in the device for automatically supplying energy to the heater element of the thermostat to open said switch.

7. In an electrically heated device, the combination with a resistance element, of a thermostat having a resistance element embodied therein, and means dependent upon a predetermined temperature in the device for automatically supplying energy to the resistance element of the thermostat and interrupting the circuit of both resistance elements by reason of the resulting dynamic action of the thermostat.

8. In a sad iron, the combination with an electric heater, of a thermostat having a resistance element embodied therein and movable under the action of a predetermined temperature in the iron to connect its resistance element to a source of energy, said thermostat being movable further by the action of the heat generated in its resistance element to interrupt the supply of energy to both the heater and said resistance element.

In testimony whereof, I have hereunto subscribed my name this 20th day of April, 1909.

WILLIAM S. HADAWAY, Jr.

Witnesses:
R. J. DEARBORN,
B. B. HINES.